US012776068B2

(12) United States Patent
A et al.

(10) Patent No.: US 12,776,068 B2
(45) Date of Patent: Oct. 27, 2026

(54) METHOD AND SYSTEM FOR MAINTAINING ALIGNMENT OF POINT-OF-VIEW IN PAN-TILT-ZOOM (PTZ) CAMERAS

(71) Applicant: Honeywell International Inc., Charlotte, NC (US)

(72) Inventors: Ramkumar A, Madurai (IN); Ganesh Raja S K, Madurai (IN); Muthu Kannan Muthuvel, Madurai (IN); Sivakumar Nagarajan, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 19/053,448

(22) Filed: Feb. 14, 2025

(65) Prior Publication Data

US 2026/0245247 A1 Aug. 20, 2026

(51) Int. Cl.

| | |
|---|---|
| ***G06T 7/80*** | (2017.01) |
| ***G06T 7/73*** | (2017.01) |
| ***H04N 17/00*** | (2006.01) |
| ***H04N 23/695*** | (2023.01) |

(52) U.S. Cl.

CPC .................. *G06T 7/80* (2017.01); *G06T 7/74* (2017.01); *H04N 17/002* (2013.01); *H04N 23/695* (2023.01); *G06T 2207/30244* (2013.01)

(58) Field of Classification Search

CPC .................................... G06T 7/70; G06T 7/80

See application file for complete search history.

(56) References Cited

U.S. PATENT DOCUMENTS

| | | | |
|---|---|---|---|
| 7,541,565 | B2 | 6/2009 | Ariyur et al. |
| 8,305,439 | B2 | 11/2012 | Cheng et al. |
| 8,451,329 | B2 | 5/2013 | Addy |
| 8,488,001 | B2 | 7/2013 | Mohanty et al. |
| 8,792,005 | B2 | 7/2014 | Huseth et al. |
| 8,957,967 | B2 | 2/2015 | Thiruvengada et al. |
| 9,767,663 | B2 | 9/2017 | Reske |
| 9,942,521 | B2 | 4/2018 | Lee et al. |
| 9,990,821 | B2 | 6/2018 | Wang et al. |
| 10,298,884 | B2 | 5/2019 | Ming et al. |
| 12,039,780 | B2 | 7/2024 | Kalirajan et al. |
| 12,167,136 | B2 | 12/2024 | Dhayalan et al. |

(Continued)

*Primary Examiner* — Michael H Hong

(74) *Attorney, Agent, or Firm* — Seager, Tufte & Wickhem, LLP

(57) ABSTRACT

The disclosure relates to a system and method for maintaining alignment of a point-of-view (POV) in a pan-tilt-zoom (PTZ) camera. The method includes determining an initial orientation of the PTZ camera by obtaining position information of the camera, time synchronization data, and information of at least one predefined reference point. Upon detecting a positional deviation from the initial orientation, the method captures a reference image of the predefined reference point using the PTZ camera's pan-tilt-zoom controls. Based on the captured reference image and the predefined reference point, a home preset for the PTZ camera is calculated. The orientation of the PTZ camera is then recalibrated by adjusting its pan-tilt-zoom controls to restore alignment to the calculated home preset. The disclosed method ensures consistent camera POV alignment, particularly in outdoor environments where disturbances may occur.

12 Claims, 10 Drawing Sheets

(56) References Cited

U.S. PATENT DOCUMENTS

| | | | |
|---|---|---|---|
| 12,301,783 | B2 | 5/2025 | Joseph et al. |
| 2008/0118104 | A1 | 5/2008 | Ariyur et al. |
| 2010/0097472 | A1 | 4/2010 | Chathukutty et al. |
| 2012/0306736 | A1 | 12/2012 | Thiruvengada et al. |
| 2015/0301174 | A1 | 10/2015 | Hellickson et al. |
| 2015/0302821 | A1 | 10/2015 | De Mers et al. |
| 2023/0368537 | A1 | 11/2023 | Bhattacharjee et al. |
| 2025/0054310 | A1* | 2/2025 | Maru ..................... G06V 20/52 |
| 2026/0113541 | A1 | 4/2026 | Ramkumar et al. |

* cited by examiner

Fixed Center Point
To calculate the distance

METHOD AND SYSTEM FOR MAINTAINING ALIGNMENT OF POINT-OF-VIEW IN PAN-TILT-ZOOM (PTZ) CAMERAS

TECHNICAL FIELD

The present disclosure relates to surveillance systems. More specifically, the present disclosure relates to methods and systems for maintaining the alignment of point-of-view (POV) in cameras, ensuring consistent surveillance coverage irrespective of environmental disturbances.

BACKGROUND

Outdoor surveillance cameras, particularly pan-tilt-zoom (PTZ) models, are widely used in public security, traffic monitoring, and industrial applications. However, these cameras often face challenges in maintaining consistent points of view (POV) due to environmental disturbances, such as strong winds, rain, or other adverse weather conditions.

Traditional methods, such as scene-change detection using image comparison, are ineffective when scenes undergo significant alterations over time. Moreover, such methods can only trigger alarms upon detecting a misalignment but lack the capability to autonomously restore the camera's original orientation. These limitations adversely affect surveillance reliability, particularly in scenarios requiring high precision for region-of-interest (ROI) analytics.

Thus, there is a need for a robust and automated system that ensures consistent camera orientation and alignment, minimizing the need for manual intervention and providing reliable surveillance coverage even in challenging conditions.

SUMMARY

The present disclosure discloses a method and system that integrates celestial navigation techniques into outdoor surveillance cameras to maintain consistent points of views (POVs), particularly under adverse weather conditions. The system calculates and adjusts the camera's orientation dynamically by using the predictable motion of celestial bodies, such as the Sun, Moon, and Stars.

According to an aspect of the disclosure, a method for maintaining alignment of a point-of-view (POV) in a pan-tilt-zoom (PTZ) camera is disclosed. The method comprises determining an initial orientation of the PTZ camera, where the determination comprises obtaining data comprising position information of the PTZ camera, time synchronization information, and information of at least one predefined reference point. The method further comprises detecting a positional deviation of the PTZ camera from the initial orientation and capturing a reference image of the predefined reference point using pan-tilt-zoom controls of the PTZ camera when the positional deviation is detected. The method further comprises calculating a home preset for the PTZ camera based on the captured reference image and the predefined reference point, and recalibrating orientation of the PTZ camera based on the calculated home preset by adjusting the pan-tilt-zoom controls.

In some embodiments, calculating the home preset comprises accounting for seasonal position variations of the predefined reference point.

In some embodiments, accounting for the seasonal position variations comprises determining a position of the predefined reference point at a specified time of day, considering the tilt in an axis of earth, and adjusting a position of the PTZ camera to a designed geographic latitude.

In some embodiments, determining the initial orientation of the PTZ camera comprises receiving the position information including geographical location coordinates of the PTZ camera, synchronizing the PTZ camera with a real-time clock, and configuring the PTZ camera to track the predefined reference point.

In some embodiments, detecting the positional deviation comprises comparing real-time images captured by the PTZ camera with reference images associated with the home preset, and identifying a positional shift based on variations in an alignment of the images.

In some embodiments, recalibrating the orientation of the PTZ camera comprises measuring the PTZ camera's current orientation using integrated gyroscopic sensors, and determining adjustment parameters for restoring the home preset.

In some embodiments, the predefined reference point is a celestial body selected from a group consisting of the Sun, Moon, and Stars.

In some embodiments, the method further comprises configuring the PTZ camera with a preset sequence of one or more celestial bodies to track during different times of the day, and automatically switching between the one or more celestial bodies based on availability and visibility conditions.

In some embodiments, calculating the home preset further comprises determining the home preset when the celestial body is partially obscured by utilizing pre-existing astronomical data and previously captured reference images.

In some embodiments, the method is implemented as a software module in one or more of a firmware of the PTZ camera, or a video management system (VMS) that controls the PTZ camera.

In some embodiments, the method further comprises continuously monitoring and recalibrating the PTZ camera to ensure consistent POV alignment over time.

In yet another embodiment, a system for maintaining alignment of a point-of-view (POV) in a pan-tilt-zoom (PTZ) camera is disclosed. The system comprises a determination module, a detection module, a capturing module, a calculation module, and a recalibration module. The determination module is configured to determine an initial orientation of the PTZ camera, where the determination comprises obtaining data comprising position information of the PTZ camera, time synchronization information, and information of at least one predefined reference point. The detection module is configured to detect a positional deviation of the PTZ camera from the initial orientation. The capturing module is configured to capture a reference image of the predefined reference point using pan-tilt-zoom controls of the PTZ camera when the positional deviation is detected. The calculation module is configured to calculate a home preset for the PTZ camera based on the captured reference image and the predefined reference point. Lastly, the recalibration module is configured to recalibrate the orientation of the PTZ camera based on the calculated home preset by adjusting the pan-tilt-zoom controls.

In some embodiments, the calculation module configured to calculate the home preset is further configured to account for seasonal position variations of the predefined reference point.

In some embodiments, the calculation module configured to account for the seasonal position variations is further configured to determine a position of the predefined reference point at a specified time of day, consider the tilt in an axis of the earth, and adjust a position of the PTZ camera to a designed geographic latitude.

In some embodiments, the determination module configured to determine the initial orientation of the PTZ camera is further configured to receive the position information including geographical location coordinates of the PTZ camera, synchronize the PTZ camera with a real-time clock, and configure the PTZ camera to track the predefined reference point.

In some embodiments, the detection module configured to detect the positional deviation is further configured to compare real-time images captured by the PTZ camera with reference images associated with the home preset, and identify a positional shift based on variations in an alignment of the images.

In some embodiments, the recalibration module configured to recalibrate the orientation of the PTZ camera is further configured to measure the PTZ camera's current orientation using integrated gyroscopic sensors and determine adjustment parameters for restoring the home preset.

In some embodiments, the predefined reference point is a celestial body selected from a group consisting of the Sun, Moon, and Stars.

In some embodiments, the system further comprises a configuration module configured to configure the PTZ camera with a preset sequence of one or more celestial bodies to track during different times of the day, and automatically switch between the one or more celestial bodies based on availability and visibility conditions.

In yet another embodiment, a non-transitory computer-readable medium having stored thereon computer-readable instructions is disclosed. The computer-readable instructions when executed by a processor, cause the processor to execute a method for maintaining alignment of a point-of-view (POV) in a pan-tilt-zoom (PTZ) camera. The method comprises determining an initial orientation of the PTZ camera, where the determination comprises obtaining data comprising position information of the PTZ camera, time synchronization information, and information of at least one predefined reference point. The method further comprises detecting a positional deviation of the PTZ camera from the initial orientation and capturing a reference image of the predefined reference point using pan-tilt-zoom controls of the PTZ camera when the positional deviation is detected. The method further comprises calculating a home preset for the PTZ camera based on the captured reference image and the predefined reference point, and recalibrating orientation of the PTZ camera based on the calculated home preset by adjusting the pan-tilt-zoom controls.

The disclosed method and system offer a transformative approach to camera alignment and orientation through celestial navigation techniques. Cost-effectiveness is a significant advantage, as the system minimizes the need for frequent recalibration or manual adjustments, substantially reducing maintenance and operational costs. This is particularly beneficial for legacy cameras, as it integrates seamlessly without requiring any hardware modifications, making it an attractive and economical solution for upgrading existing surveillance infrastructure.

The disclosed system excels in precision, leveraging celestial navigation to provide highly accurate location tracking that remains unaffected by adverse weather conditions or time of day. Unlike conventional systems that rely heavily on image-based methods, this system ensures reliability by using celestial bodies as reference points, mitigating the challenges posed by environmental changes such as fog, rain, or poor lighting conditions.

The system is designed for consistency, delivering dependable surveillance performance over extended periods without degradation in accuracy or functionality. This enhances the effectiveness of security and monitoring operations, making it an invaluable tool for long-term deployment. It is suitable for a wide range of applications, including smart city surveillance, border security, and wide-area monitoring, catering to diverse and demanding operational requirements.

Further, the disclosure demonstrates adaptability, being compatible with both fixed and PTZ cameras. It not only supports precise alignment but also enhances the functionality of PTZ controls such as presets, tours, patterns, and privacy masks, ensuring that these features operate with optimal accuracy. This adaptability makes the system a comprehensive and scalable solution for modern surveillance needs, addressing both technical and operational challenges effectively.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF DRAWINGS

Embodiments of the subject matter will hereinafter be described in conjunction with the following drawing figures, wherein like numerals denote like elements, and.

Figure 1:
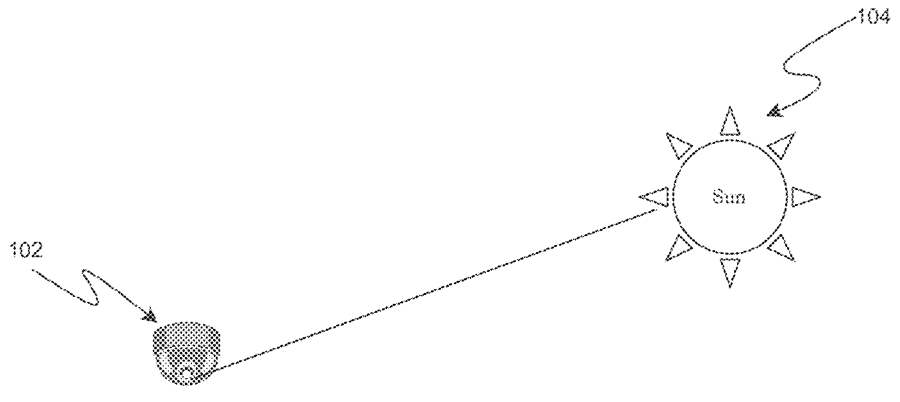
FIG. 1 illustrates a configuration where a camera is preset to track a specific celestial body, such as Sun or Moon, according to an embodiment of this disclosure.

Further, skilled artisans will appreciate that elements in the drawings are illustrated for simplicity and may not have necessarily been drawn to scale. For example, the flow charts illustrate the method in terms of the most prominent steps involved to help improve understanding of aspects of the present disclosure. Furthermore, in terms of the construction of the apparatus, one or more components of the apparatus may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 illustrates a configuration where a camera 102 is preset to track a specific celestial body, such as Sun or Moon, according to an embodiment of the disclosure. This setup is fundamental to the disclosed system's ability to maintain consistent alignment and point-of-view (POV), particularly under environmental disturbances.

Environmental disturbances that can disrupt the camera's alignment include strong winds, heavy rainfall, vibrations from nearby machinery, or impacts caused by external forces such as falling debris or storms. These disturbances can cause minor shifts in the camera's position, which over time, may accumulate into significant deviations that affect the consistency of its point-of-view (POV).

Such deviations pose challenges for surveillance accuracy, particularly in scenarios requiring precise region-of-interest (ROI) monitoring. Additionally, adverse weather conditions, such as hurricanes or cyclones, may cause severe misalignments, rendering traditional recalibration methods ineffective. The disclosed system addresses these challenges by using celestial presets to dynamically recalibrate the camera's orientation, ensuring reliable performance even in the face of such environmental disruptions.

During the initial setup process, the following steps are performed to establish the celestial preset including preset selection, Global Positioning System (GPS)-based positioning, S-based positioning, preset calibration for orientation, in time synchronization, and presets for dynamic adjustment.

In the preset selection, a user or installation system configures the camera 102 to track one or more celestial bodies. In an embodiment, this involves selecting a specific celestial body, such as the Sun or Moon, as the reference point for alignment. In an embodiment, the selection is influenced by the predictable movement patterns and visibility of these celestial bodies at the camera's geographical location.

In the S-based positioning, the camera's GPS coordinates are used to determine its precise geographical location. This data forms the basis for calculating the expected position of the selected celestial body at any given time. For example, using the GPS location, the system can predict the Sun's position with respect to the camera's installation site.

In the preset calibration for orientation, once the celestial body is selected, the camera 102 undergoes calibration to align its field of view with the expected position of the celestial body at a specific time. This calibration accounts for the camera's mounting angle, its orientation, and its distance from ground level.

In an embodiment, the disclosed configuration is compatible with both fixed and Pan-Tilt-Zoom (PTZ) cameras 102. For fixed cameras 102, the celestial preset ensures the field of view aligns with a specific angle relative to the celestial body's calculated position.

For the PTZ cameras 102, the system uses pan, tilt, and zoom capabilities to dynamically track the celestial body over time. This allows the camera 102 to adjust its orientation in real-time to maintain alignment.

In time synchronization, accurate tracking of the celestial body requires real-time synchronization with a clock. The camera's internal clock or an external time synchronization system ensures the calculations for the celestial body's position are precise, enabling the camera 102 to maintain consistent alignment.

In the presets for dynamic adjustment, in addition to static alignment, the system configures dynamic presets for tracking celestial bodies as they move across the sky. These presets enable real-time recalibration, ensuring the camera 102 can restore its original POV even after disturbances, such as wind or vibrations, alter its position.

Once configured, the camera 102 leverages its celestial presets to monitor the selected celestial body continuously. For PTZ cameras 102, the celestial body's movement is tracked using pre-calculated trajectories derived from astronomical data. If the camera's orientation is disturbed due to environmental factors, the celestial preset allows the system to recalibrate automatically, restoring the camera's POV. The disclosed capability ensures that the camera 102 remains effective for surveillance and analytics applications by maintaining a consistent and accurate field of view.

Figure 2:
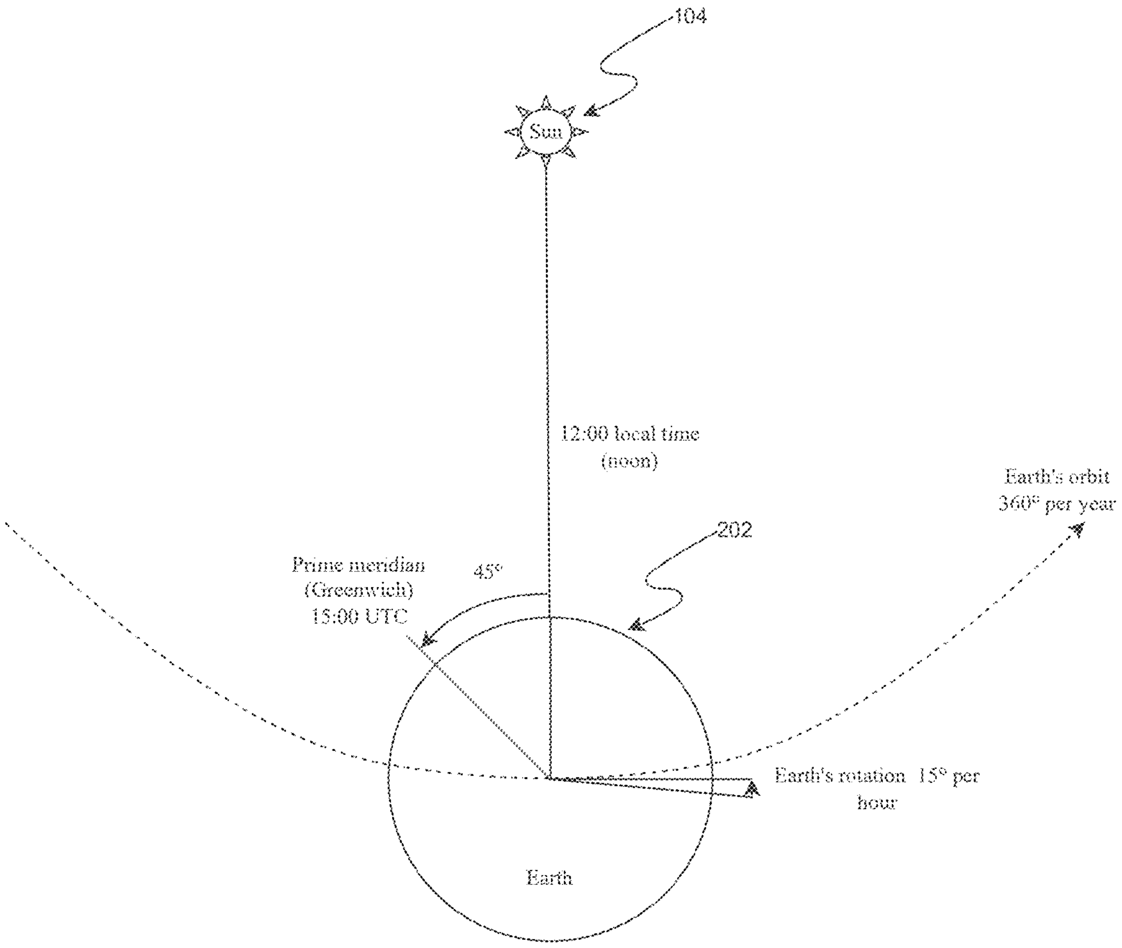
FIG. 2 illustrates the relationship between the Earth's rotation, the Earth's orbit around the Sun, and the position of the Sun as it pertains to local and universal time according to an embodiment of this disclosure.

FIG. 2 illustrates the relationship between Earth's rotation, the Earth's orbit around the Sun 104, and the position of the Sun 104 as it pertains to local and universal time according to an embodiment of this disclosure. The figure represents celestial navigation techniques that rely on astronomical positioning to maintain consistent alignment of systems, such as outdoor surveillance cameras 102.

The FIG. 2 includes the following components the Sun 104, the Earth 202, a prime meridian and UTC reference, and the dashed Earth's orbit path.

The Sun 104 is depicted at its zenith (highest point) at 12:00 local time (noon) for the location under observation. At this moment, the Sun 104 is directly overhead relative to the local meridian.

The Earth's rotation and orbit around the Sun 104 are central to the figure. The Earth's rotation axis is aligned to show a rotation rate of 150 per hour, which corresponds to one full rotation (360°) in 24 hours. This rotational motion causes the apparent movement of the Sun 104 across the sky. The Earth's orbit around the Sun 104 is indicated as 360° per year, representing the annual revolution that causes seasonal changes and slight variations in solar positions over time.

The Prime Meridian (Greenwich, 0° longitude) is identified as the 15:00 UTC (Coordinated Universal Time) reference point in the figure. The local meridian is 450 to the east of the Prime Meridian, where the Sun 104 is at its zenith at 12:00 local time.

The time difference is calculated as follows:

$$45°(\text{longitude}) \div 15°(\text{rotation per hour}) = 3 \text{ hours ahead of } UTC$$

This aligns the local noon at 12:00 with 15:00 UTC at Greenwich.

The Earth's orbit around the Sun 104 is depicted as a dashed line, representing its elliptical path through space over the course of one year. The orbit is responsible for solar declination changes, affecting the Sun's apparent position at noon throughout the year.

The figure underscores the principles of celestial navigation and their use in dynamically aligning outdoor systems, such as surveillance cameras 102. By leveraging the predictable movements of celestial bodies like the Sun 104.

The Earth's rotation allows for calculating time-based adjustments to align systems (15° per hour). The longitude and local time demonstrate how time zones are determined based on Earth's rotational position relative to the prime meridian. The annual solar position changes are calculated by the Earth's orbit introduction variations in the Sun's apparent position, requiring precise calculations to adjust system orientation dynamically.

Calculating solar positions at specific times helps recalibrate cameras 102 affected by environmental disturbances. Real-time clock synchronization ensures aligning local time with UTC results in accuracy in celestial navigation algorithms. Surveillance Systems ensure consistent POV coverage by dynamically compensating for orientation shifts.

Figure 3:
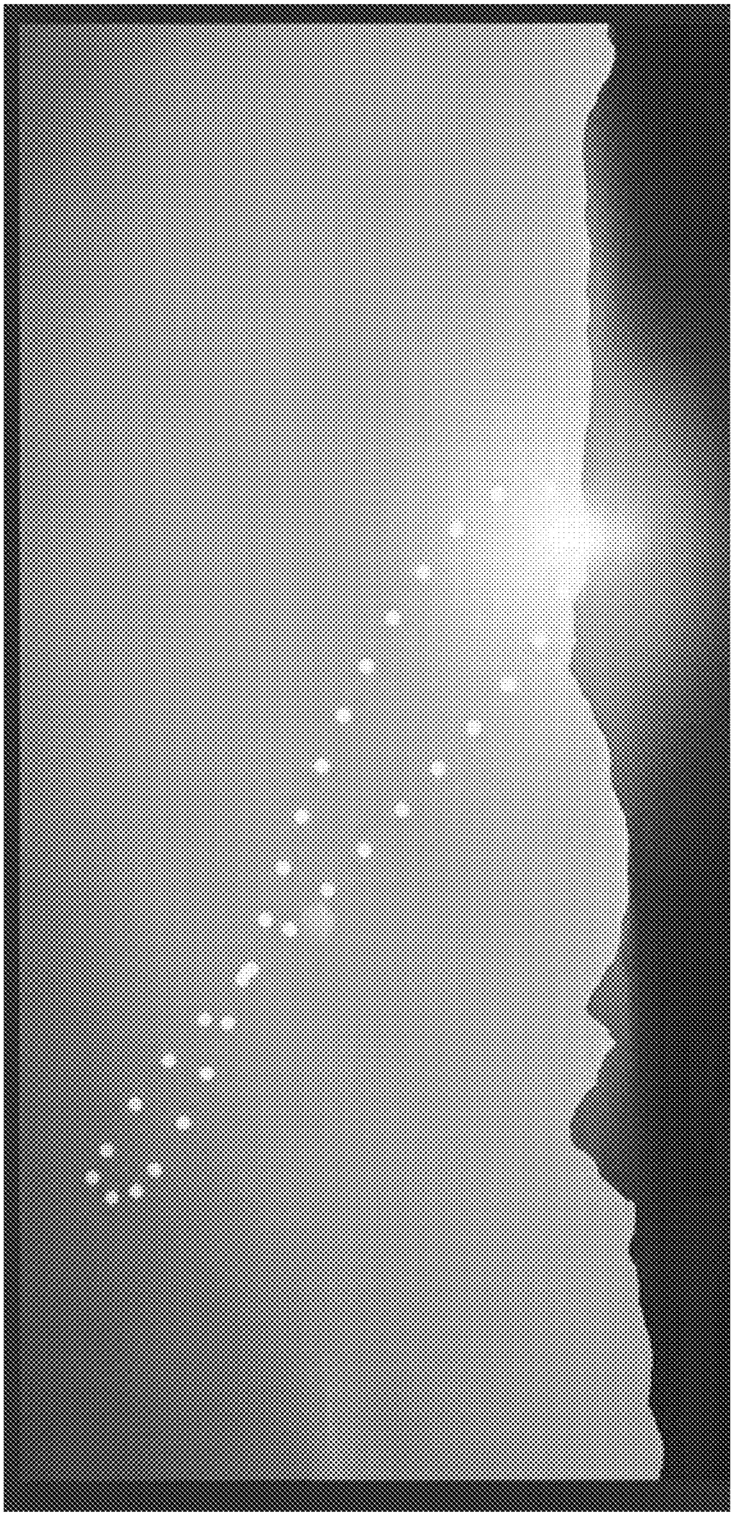
FIG. 3 illustrates a visual representation of the Sun's predictable motion across the sky at the same time on different days of the year according to an embodiment of this disclosure.

FIG. 3 illustrates a visual representation of the Sun's predictable motion across the sky at the same time on different days of the year according to an embodiment of this disclosure. The figure highlights the variation in the Sun's apparent position caused by the Earth's axial tilt and its orbital motion around the Sun 104. This phenomenon is fundamental to understanding the application of celestial navigation techniques for aligning and recalibrating outdoor surveillance cameras 102.

At the same local time (e.g., 12:00 noon), the Sun 104 appears in slightly different positions in the sky on different days of the year. These changes occur because of the Earth's axial tilt of approximately 23.5°, which causes the Sun 104 to appear at varying altitudes and the Earth's elliptical orbit, leading to changes in the Sun's declination (latitude position relative to the equator) over the year.

Further, the Sun's path changes with the seasons. In winter solstice (December), the Sun 104 appears at its lowest altitude during noon due to the tilt of the Earth's axis away from the Sun 104. In summer solstice (June), the Sun 104 reaches its highest altitude because the Earth's axis tilts toward the Sun 104. During equinoxes (March and September), the Sun 104 is positioned directly over the equator, appearing at a mid-range altitude. These observations are consistent with the annual solar movement across the sky.

The series of images of the Sun 104 demonstrate a gradual shift in the Sun's position. The vertical movement indicates changes in the Sun's altitude angle. The horizontal movement represents slight shifts in azimuth (the Sun's horizontal angle relative to true north). Such patterns create a predictable solar path, which can be mathematically modeled using celestial navigation algorithms.

The changes in the Sun's position, as depicted in the CCTV images, are critical for the implementation of the disclosed celestial navigation techniques to maintain the alignment of outdoor cameras 102.

Sun 104 as a celestial reference, the Sun's predictable position throughout the year serves as a reliable reference point for recalibrating a camera's orientation. By comparing real-time images with the Sun's expected position (based on GPS coordinates, date, and time), the system can detect misalignments. Automation of recalibration, the CCTV images demonstrate how the system can capture and analyze the Sun's position at specific times daily.

Any deviation in the Sun's position relative to the preset celestial alignment indicates a change in the camera's orientation, triggering an automatic adjustment. The gradual shifts in the Sun's position provide a consistent baseline for comparison, ensuring the system remains operational even in adverse conditions such as strong winds or physical disturbances.

Since the Sun's movement is highly predictable, the system can maintain alignment over extended periods with minimal manual intervention. By capturing daily images of the Sun's position, the system dynamically recalibrates to maintain consistent surveillance coverage.

For seasonal adjustments, the figure highlights the need to account for seasonal changes in solar position when implementing celestial navigation algorithms. CCTV cameras can use Sun-position analysis for continuous alignment checks without requiring external inputs or recalibration tools.

Figure 4:
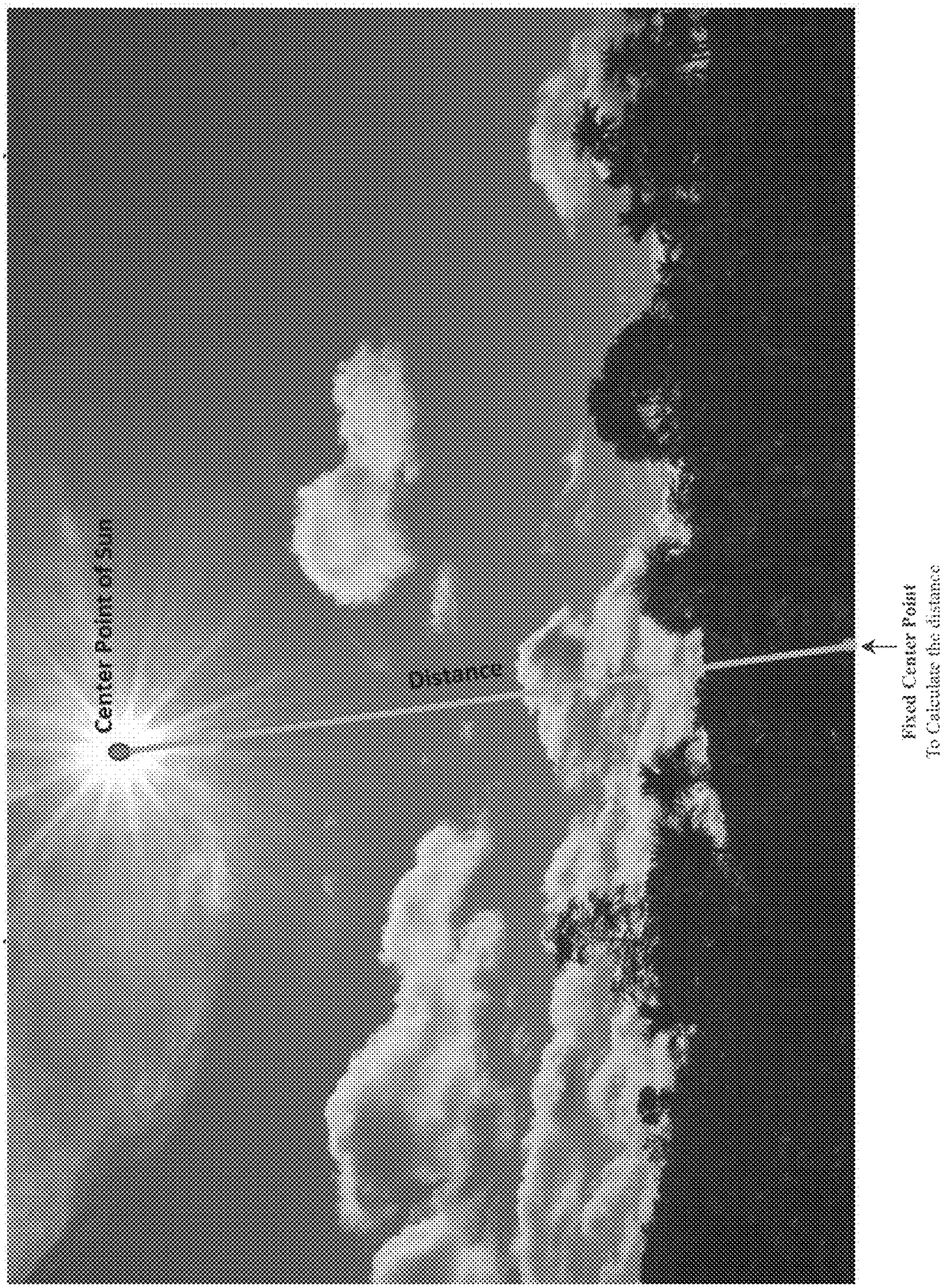
FIG. 4 illustrates a real-world implementation where a surveillance camera is placed at a fixed center point and configured to track a specific celestial body, such as the Sun or the Moon according to an embodiment of this disclosure.

FIG. 4 illustrates a real-world implementation where a surveillance camera is placed at a fixed center point and is configured to track a specific celestial body, such as the Sun or the Moon according to an embodiment of this disclosure. The figure further demonstrates how the system calculates the distance between the camera's fixed center point (reference point) and the observed center point of the celestial body.

The camera is mounted at a fixed reference position (center point), ensuring its spatial coordinates remain constant. This fixed installation serves as the baseline for detecting deviations in the camera's orientation.

The camera is preset to track a celestial body, such as the Sun or Moon, based on: GPS coordinates of the camera's location, date and time synchronized with a Real-Time Clock (RTC), celestial navigation data that provides the expected position of the Sun or Moon at a given location and time.

The camera captures an image of the celestial body. The center point of the celestial body, as observed in the image, is determined through image processing techniques. For example, the Sun's center may be identified as a circular centroid in the captured frame.

The system calculates the distance (or deviation) between the camera's fixed center point (preset reference). The center point of the celestial body is captured in the image. This distance is measured in terms of pixel offset within the camera's field of view.

Any discrepancy between the preset center point and the observed celestial center point indicates that the camera's orientation has shifted. Such deviations may occur due to environmental disturbances like strong winds, vibrations, physical interference, or mount instability.

Upon detecting the deviation, the system triggers an automatic recalibration mechanism. The camera's pan-tilt-zoom (PTZ) controls adjust the orientation to realign the observed celestial body's center point with the preset center point.

The camera is preset to track a celestial body using astronomical data corresponding to its GPS location and synchronized time. The camera continuously observes the celestial body at predefined intervals (e.g., every few minutes or hours).

The system processes the captured images to detect the celestial body, determine its center point in the frame, and compare it to the preset reference point.

The offset distance between the preset center point and the celestial body's observed center point is calculated. For example, a deviation of X pixels along the horizontal axis (X-axis) and Y pixels along the vertical axis (Y-axis). If a significant distance (or offset) is detected. The system identifies that the camera's orientation has shifted. The camera's PTZ mechanisms dynamically adjust to restore alignment, ensuring the celestial body's center point matches the preset center point.

The figure plays a pivotal role in illustrating the core principles of the disclosed system. By leveraging the Sun or Moon's predictable position, the system establishes a consistent reference for detecting deviations in camera orientation.

The ability to calculate the distance between the camera's fixed center point and the celestial body's center point enables precise detection of misalignment. The system automates the realignment process, minimizing manual intervention and ensuring reliable surveillance coverage.

The approach remains effective even in challenging conditions, such as strong winds or vibrations, which may cause temporary orientation shifts. The figure highlights how the method can be implemented in real-world scenarios to maintain the camera's alignment over extended periods.

The system's ability to measure small deviations (in pixels) ensures precise detection and realignment. Using celestial bodies as fixed reference points eliminates reliance on external markers or landmarks. The method is suitable for various outdoor environments, including high-wind or unstable locations. The solution can be integrated with existing camera hardware, reducing the need for expensive upgrades.

The figure provides a real-world representation of how the system maintains camera alignment by tracking a celestial body, such as the Sun or Moon. It visually demonstrates the process of detecting deviations through distance calculations between the camera's fixed center point and the observed center point of the celestial body. This forms the foundation for the system's automated recalibration mechanism, ensuring consistent and reliable surveillance coverage despite environmental disturbances.

Figure 5A:
FIG. 5(*a*)-(*c*) illustrates the automatic recalibration of the camera in case of weather-induced disturbances according to an embodiment of this disclosure.
Figure 5B:
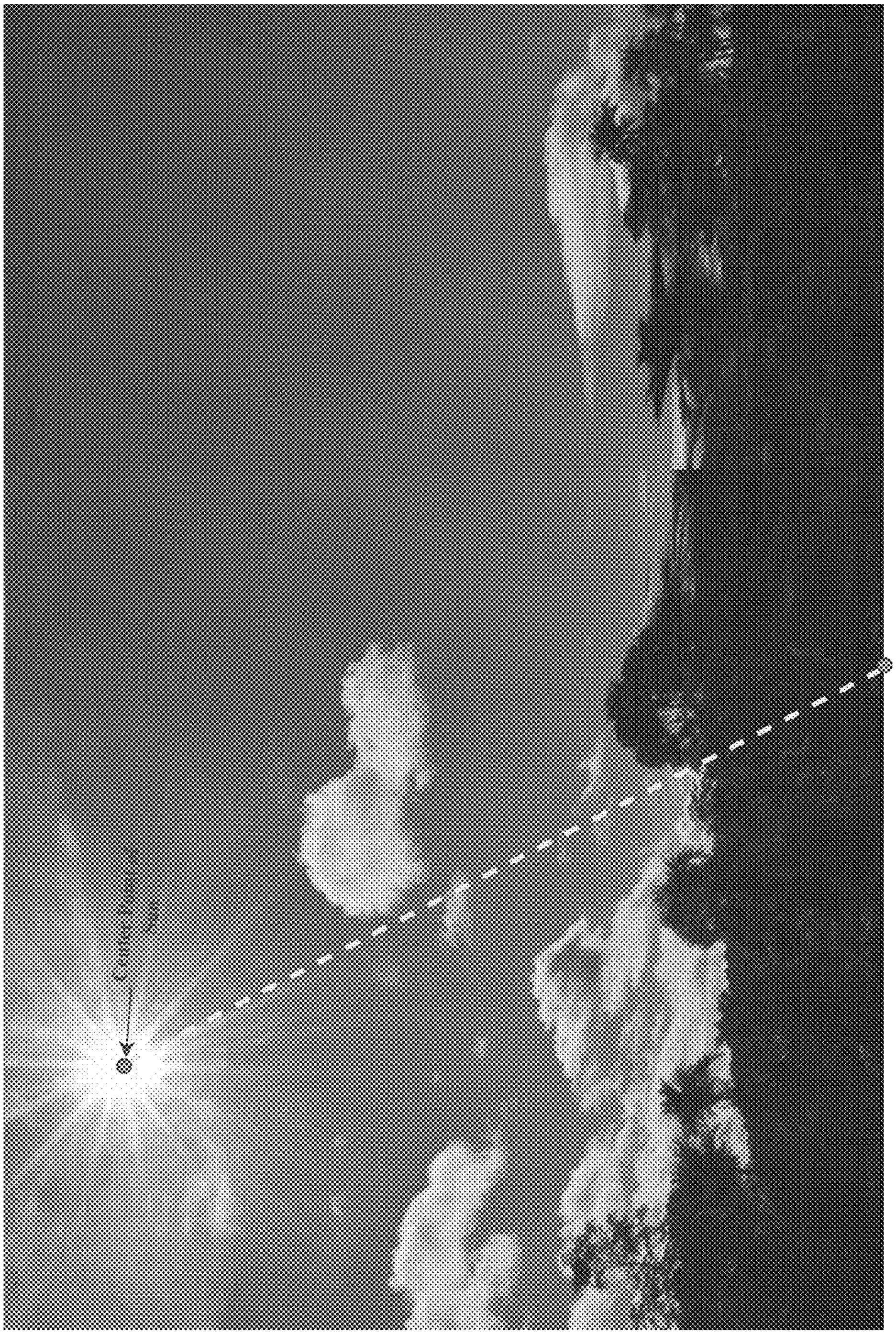
Figure 5C:
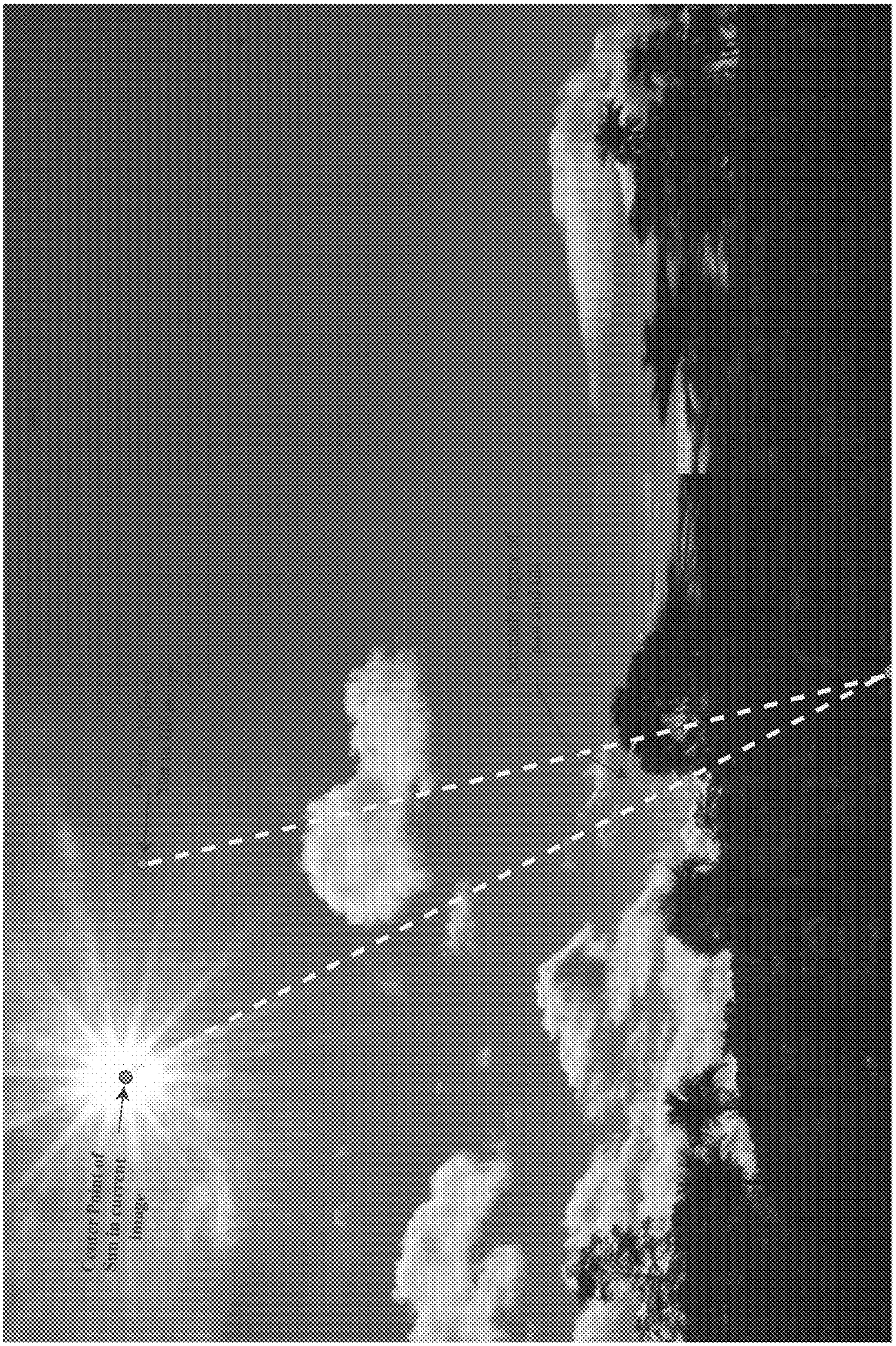

FIG. 5(*a*)-(*c*) illustrates a method and system for the automatic recalibration of an outdoor PTZ (Pan-Tilt-Zoom) camera when weather-induced disturbances cause its Point-of-View (POV) to deviate from the preset orientation. The invention uses celestial navigation techniques combined with real-time monitoring to ensure consistent alignment of the camera.

The architecture and operation of the system incorporate multiple components and methods to detect deviations and automatically recalibrate the camera's orientation. The system comprises of GPS module, celestial preset database, Real-Time Clock (RTC), gyroscopic sensors, processing unit, and PTZ Controls.

The GPS module captures the exact location coordinates (latitude, longitude, and altitude) of the camera. In an embodiment, the GPS module is integrated into the camera hardware for seamless GPS data retrieval. In an embodiment, external GPS devices are connected via standardized communication protocols (e.g., NMEA-0183, serial ports, or USB). Further, the GPS module uses existing network-based geolocation services for fixed-position cameras without embedded GPS modules.

The celestial preset database stores predefined positions of celestial bodies (e.g., the Sun or Moon) for specific GPS locations and times. In an embodiment, a cloud-based celestial database is accessible via secure internet protocols (e.g., HTTPS). Local on-device storage is preloaded with astronomical data for offline operations. Additionally, dynamic updates of celestial data are based on changes in astronomical models (e.g., for leap seconds or Earth rotation variations).

The real-time clock (RTC) ensures accurate time synchronization with astronomical data. In an embodiment, embedded RTC hardware is synchronized with global standards such as UTC (Universal Time Coordinated). Network Time Protocol (NTP)-based synchronization is for devices connected to the internet. Manual time synchronization during camera installation for remote or offline locations.

The gyroscopic sensors measure angular deviations (pitch, yaw, and roll) in the camera's orientation as shown in FIG. 5(*a*). In an embodiment, the gyroscopic sensors integrate MEMS (Micro-Electromechanical Systems)-based gyroscopic sensors. External gyroscopes are interfaced with the camera's processing unit for real-time deviation data. Combination of gyroscopic data with accelerometer feedback for more precise alignment corrections.

The processing unit executes celestial navigation algorithms, determines deviations, and adjusts the camera orientation dynamically. In an embodiment, a dedicated microprocessor is embedded within the camera for real-time computations. Software-based processing is integrated into Video Management Software (VMS) for centralized camera control. Cloud-based processing is where real-time data is transmitted to a server for computation and recalibration instructions.

The PTZ controls adjust the camera's pan, tilt, and zoom mechanisms to restore alignment. In an embodiment, the PTZ controls integrate PTZ motors controlled via camera firmware. Software-based control through VMS interfaces to trigger external motors. Manual override options to supplement automatic recalibration.

During the initial state before disturbance, the camera's GPS coordinates are configured during initial installation. The celestial preset (e.g., Sun or Moon) is selected from the celestial database based on the camera's location and synchronized time (RTC). Celestial navigation algorithms calculate the expected position of the preset celestial body at the given time and location.

During normal monitoring, the camera maintains its POV aligned with the celestial preset under stable conditions. Gyroscopic sensors continuously monitor the camera's angular orientation for any deviations as shown in FIG. 5(*b*).

After detection of weather-induced disturbance, an environmental factor, such as strong winds, heavy rain, or a hurricane, causes a shift in the camera's orientation. The POV deviates from the preset celestial alignment. Gyroscopic sensors measure the deviation in terms of pitch, yaw, and roll values. The processing unit compares the camera's current POV with the predefined celestial alignment.

Upon detecting a deviation, the system activates the PTZ controls to initiate automatic recalibration as shown in FIG. 5(*c*).

The camera's PTZ motors adjust to locate and capture a snapshot of the preset celestial body (e.g., the Sun), which remains visible despite disturbances. The processing unit calculates the deviation distance between the current center point of the celestial body (captured in the image) and the preset center point as shown in FIG. 5(*c*). Based on the calculated deviation, the PTZ controls adjust the camera's orientation to align the celestial body's center point with the preset.

The camera's POV is restored to its original orientation, ensuring consistent surveillance coverage. The system continues to monitor for deviations and performs repeated recalibrations as required.

According to an aspect of the invention, the method comprises integrating all core components: GPS module, celestial preset database, RTC, gyroscopic sensors, processing unit, and PTZ controls. Configuring the camera with GPS coordinates, synchronized time, and celestial presets during installation. Using gyroscopic sensors for real-time deviation detection. Capturing celestial body snapshots during disturbances to perform dynamic recalibration using celestial navigation calculations. Ensuring compatibility with legacy camera systems by integrating the system with existing firmware or VMS software. Providing continuous recalibration functionality to account for recurring environmental disturbances.

For 180-Degree pole rotation, the camera pole is rotated 180 degrees, simulating a significant disturbance (e.g., hurricane), requiring recalibration to restore the original preset POV.

The tables also demonstrate the system's capability to dynamically calculate the camera's position relative to the celestial preset during both normal and disturbed conditions, enabling the camera to maintain alignment and perform automatic recalibration.

In the tables the fixed GPS coordinates of the installed PTZ camera:

Latitude: 9.9279878

Longitude: 78.1225142

Preset celestial body to track is the Sun. The Sun's position (elevation and azimuth) is dynamically calculated for each hour of the day based on the camera's location and synchronized time (RTC).

The output parameters include elevation, azimuth, pan, tilt, and zoom. The elevation indicates vertical position of the celestial body relative to the horizon, in degrees. The azimuth indicates horizontal position of the celestial body relative to the observer, in degrees. The pan indicates horizontal rotation angle of the camera. The tilt indicates the vertical angle of the camera's orientation. The zoom indicates zoom level for capturing the celestial body.

Table 1 represents the normal operation where the PTZ camera tracks the Sun's position throughout the day without significant disturbances:

TABLE 1

| Time | Elevation | Azimuth | PAN (B + D6) | TILT (C + E6) | ZOOM | PAN (D + G) | TILT | ZOOM |
|---|---|---|---|---|---|---|---|---|
| 6:48:09 | −0.833 | 87.49 | L | M | N | X | Y | Z |
| 7:00:00 | 2.08 | 87.99 | 10 | 10 | 10 | 10 | 10 | 10 |
| 8:00:00 | 16.86 | 90.55 | 26.86 | 100.55 | 10 | 36.86 | 110.55 | 10 |
| 9:00:00 | 31.63 | 93.36 | 41.63 | 103.36 | 10 | 51.63 | 113.36 | 10 |
| 10:00:00 | 46.35 | 97.03 | 56.35 | 107.03 | 10 | 66.35 | 117.03 | 10 |
| 11:00:00 | 60.91 | 103.14 | 70.91 | 113.14 | 10 | 80.91 | 123.14 | 10 |
| 12:00:00 | 74.82 | 118.80 | 145.73 | 128.80 | 10 | 155.73 | 138.80 | 10 |
| 13:00:00 | 82.31 | 192.97 | 92.31 | 202.97 | 10 | 102.31 | 212.97 | 10 |
| 14:00:00 | 71.78 | 246.86 | 81.78 | 256.86 | 10 | 91.78 | 266.86 | 10 |
| 15:00:00 | 57.61 | 258.79 | 67.61 | 268.79 | 10 | 77.61 | 278.79 | 10 |
| 16:00:00 | 43.00 | 264.08 | 53.00 | 274.08 | 10 | 63.00 | 284.08 | 10 |
| 17:00:00 | 28.26 | 267.48 | 38.26 | 277.48 | 10 | 48.26 | 287.48 | 10 |
| 18:00:00 | 13.49 | 270.22 | 23.49 | 280.22 | 10 | 33.49 | 290.22 | 10 |
| 18:58:11 | −0.833 | 272.71 | 9.167 | 282.71 | 10 | 19.167 | 292.71 | 10 |

The below-provided tables 1 and 2 demonstrate the implementation of the automatic recalibration system for PTZ (Pan-Tilt-Zoom) CCTV cameras using celestial navigation techniques. The tables outline the process for calculating the pan, tilt, and zoom angles of the camera based on celestial body positions (e.g., Sun) over specific hours during the day. Two scenarios are presented as normal setup and 180-degree pole rotation. In normal setup, regular tracking and alignment of the camera is with the celestial body movement.

The following implementation describes how the system performs under a hurricane attack. During the initial Setup, the PTZ camera is installed with GPS coordinates and celestial presets. A hurricane causes the camera pole to rotate 180 degrees. The system detects the deviation using gyroscopic sensors and recalculates the celestial body's position (e.g., Sun). Using the captured snapshot of the Sun, the processing unit realigns the camera to its home preset dynamically.

Table 2 demonstrates the recalibration of the camera angles after a 180-degree pole rotation:

TABLE 2

| Time | Elevation | Azimuth | PAN (B + D6) | TILT (C + E6) | ZOOM | PAN (D + G) | TILT | ZOOM |
|---|---|---|---|---|---|---|---|---|
| 6:48:09 | −0.833 | 87.49 | L | M | N | X | Y | Z |
| 7:00:00 | 2.08 | 87.99 | 180 | 10 | 10 | 180 | 10 | 10 |
| 8:00:00 | 16.86 | 90.55 | 196.86 | 100.55 | 10 | 376.86 | 110.55 | 10 |

TABLE 2-continued

| Time | Elevation | Azimuth | PAN (B + D6) | TILT (C + E6) | ZOOM | PAN (D + G) | TILT | ZOOM |
|---|---|---|---|---|---|---|---|---|
| 9:00:00 | 31.63 | 93.36 | 211.63 | 103.36 | 10 | 391.63 | 113.36 | 10 |
| 10:00:00 | 46.35 | 97.03 | 226.35 | 107.03 | 10 | 406.35 | 117.03 | 10 |
| 11:00:00 | 60.91 | 103.14 | 240.91 | 113.14 | 10 | 420.91 | 123.14 | 10 |
| 12:00:00 | 74.82 | 118.80 | 254.82 | 128.80 | 10 | 434.82 | 138.80 | 10 |
| 13:00:00 | 82.31 | 192.97 | 262.31 | 202.97 | 10 | 442.31 | 212.97 | 10 |
| 14:00:00 | 71.78 | 246.86 | 251.78 | 256.86 | 10 | 431.78 | 266.86 | 10 |
| 15:00:00 | 57.61 | 258.79 | 237.61 | 268.79 | 10 | 417.61 | 278.79 | 10 |
| 16:00:00 | 43.00 | 264.08 | 223.00 | 274.08 | 10 | 403.00 | 284.08 | 10 |
| 17:00:00 | 28.26 | 267.48 | 208.26 | 277.48 | 10 | 388.26 | 287.48 | 10 |
| 18:00:00 | 13.49 | 270.22 | 193.49 | 280.22 | 10 | 373.49 | 290.22 | 10 |
| 18:58:11 | −0.833 | 272.71 | 179.167 | 282.71 | 10 | 359.167 | 292.71 | 10 |

The above tables demonstrate the invention's robustness in handling normal and disturbed conditions. By recalculating the camera's angles based on celestial navigation and realigning the PTZ controls dynamically, the system ensures consistent POV alignment. This enables reliable surveillance coverage even under extreme weather conditions.

Figure 6:
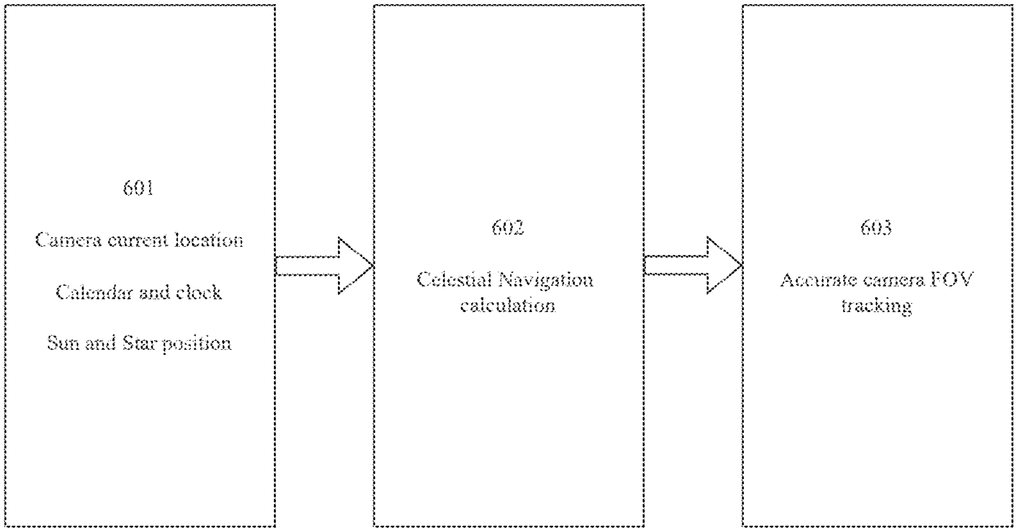
FIG. 6 illustrates a process flow for achieving accurate Field of View (FOV) tracking of a camera using celestial navigation techniques according to an embodiment of this disclosure.

FIG. 6 illustrates a process flow for achieving accurate Field of View (FOV) tracking of a camera using celestial navigation techniques according to an embodiment of the disclosure. The figure outlines the sequential steps involved in leveraging celestial data, including camera location, time, and celestial body positions, to calculate and maintain the camera's accurate alignment and point-of-view (POV).

The first block 601 represents the input acquisition phase. To initiate accurate celestial navigation calculations, the system gathers the following essential inputs a camera current location, calendar, and clock.

For gathering the camera's current location, the geographic coordinates (latitude and longitude) of the camera are obtained using a GPS sensor or a similar location determination system. This ensures that the celestial calculations are location specific.

For gathering calendars and clocks, accurate time and date data are retrieved using a Real-Time Clock (RTC) or synchronized time server. This enables the determination of the position of celestial objects at a specific instant.

For gathering the Sun and Star position, the system references astronomical databases or algorithms to retrieve the real-time position (elevation and azimuth) of celestial objects such as the Sun, Moon, and prominent stars based on the camera's current location and time. This forms the baseline for the camera's orientation alignment.

The second block 602 represents the processing phase where celestial navigation calculations are performed. The system calculates the expected position (elevation and azimuth angles) of the celestial object(s) based on the input data from block 601. This involves applying astronomical models or algorithms, such as the Solar Position Algorithm (SPA) or similar techniques, to determine the trajectory of celestial objects.

Using the calculated celestial object positions, the system determines the necessary pan, tilt, and zoom angles of the camera to align its Field of View (FOV) with the celestial body. If a deviation is detected (e.g., due to environmental disturbances like wind or pole rotation), the system computes the correction parameters required to restore alignment.

The third block 603 represents the output phase, where the camera's alignment is adjusted to achieve accurate FOV tracking. Firstly, in dynamic camera realignment, the system transmits the calculated pan, tilt, and zoom parameters to the camera's control unit, ensuring realignment with the celestial object's position.

This process is dynamic and real-time, enabling the camera to continuously track the celestial body's movement. By aligning the camera with celestial objects, the system maintains the camera's pre-set point-of-view (POV) despite external disturbances such as vibration, wind, or pole movement. This ensures consistent and precise monitoring or surveillance.

FIG. 6 demonstrates a systematic process for leveraging celestial navigation to calculate and maintain the accurate alignment of a camera's FOV By integrating location data, time inputs, and celestial positions, the system ensures dynamic recalibration of the camera, enabling reliable and disturbance resistant POV tracking.

Figure 7:
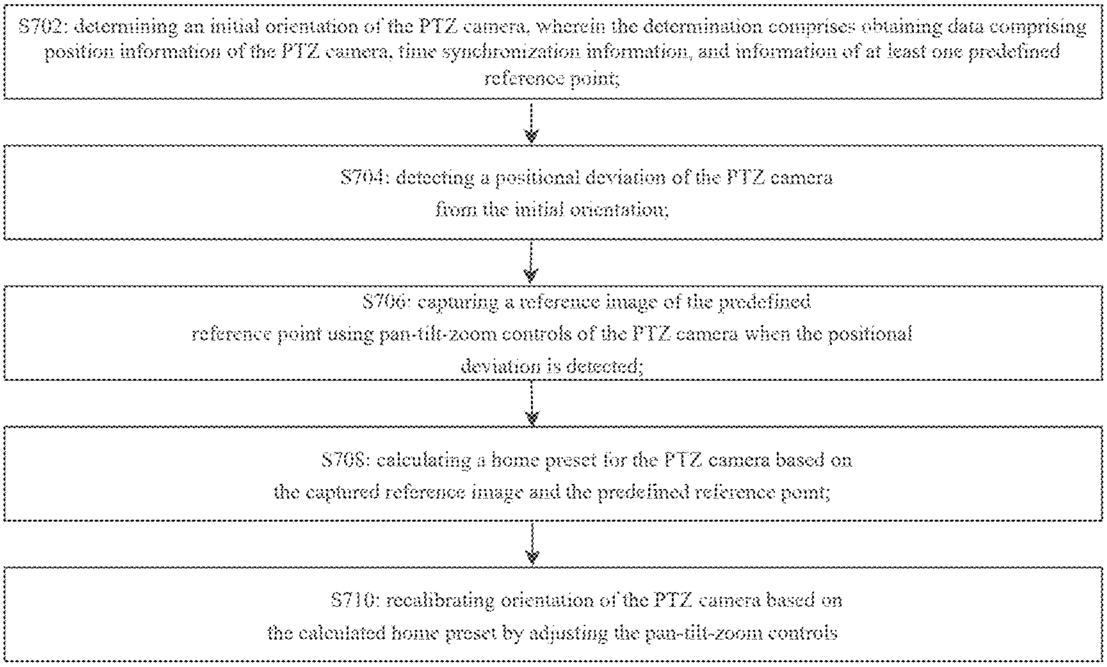
FIG. 7 illustrates a method for maintaining alignment of a point-of-view (POV) in a pan-tilt-zoom (PTZ) camera according to an embodiment of this disclosure.

FIG. 7 illustrates a method for maintaining alignment of a point-of-view (POV) in a pan-tilt-zoom (PTZ) camera according to an embodiment of the disclosure. The method comprises determining an initial orientation of the PTZ camera at step S702, where the determination comprises obtaining data comprising position information of the PTZ camera, time synchronization information, and information of at least one predefined reference point.

In some embodiments, determining the initial orientation of the PTZ camera includes obtaining position information such as geographical location coordinates of the PTZ camera using a Global Positioning System (GPS) module or similar positioning systems. The obtained position information allows precise identification of the camera's installation location. Additionally, the PTZ camera is synchronized with a real-time clock (RTC) to ensure time alignment with astronomical data corresponding to the predefined reference point. The real-time clock may be synchronized with a global time standard such as Coordinated Universal Time (UTC) to ensure accuracy across various time zones.

Further, in some embodiments, configuring the PTZ camera to track the predefined reference point involves selecting a celestial body, such as the Sun, Moon, or stars, as a reference. The selection of the reference point can be based on the camera's geographical location, date, and time to ensure visibility and accurate tracking. For instance, in daytime conditions, the Sun may be selected as the reference point, whereas at night, the Moon or specific stars may be used. The celestial body information, including its position in terms of azimuth and elevation angles, may be retrieved from a celestial navigation database or calculated using celestial navigation algorithms.

In an embodiment, the method may involve a configuration step where the PTZ camera's software or firmware is programmed to identify and track the predefined celestial reference point dynamically. The celestial body's trajectory is continuously monitored using the camera's pan, tilt, and zoom capabilities to facilitate initial alignment. This dynamic tracking ensures that the PTZ camera remains aligned with the predefined celestial body, accounting for changes in its position throughout the day or night.

In certain embodiments, the method may also account for environmental conditions. For example, if cloud cover partially obstructs the celestial body, the camera may rely on previously calculated or interpolated positional data of the celestial body to maintain alignment. The system can further integrate gyroscopic sensors or accelerometers to validate and refine the orientation data obtained through GPS and celestial navigation techniques.

Thus, step S702 establishes a robust and accurate initial orientation for the PTZ camera using position information, real-time synchronization, and tracking of a predefined celestial reference point, ensuring reliable alignment of the camera's point-of-view under varying environmental and operational conditions.

The method further comprises, at step S704, detecting a positional deviation of the PTZ camera from the initial orientation, and capturing a reference image of the predefined reference point using pan-tilt-zoom controls of the PTZ camera when the positional deviation is detected at step S706.

In some embodiments, detecting the positional deviation comprises comparing real-time images captured by the PTZ camera with reference images associated with the home preset. The home preset corresponds to the predefined orientation of the camera determined during the initial setup, including azimuth, tilt, and zoom levels aligned with the celestial reference point. The comparison of real-time images with reference images can be performed using image processing algorithms that analyze pixel-level variations, edge detection, or feature extraction techniques to identify discrepancies. For instance, if the Sun or Moon serves as the predefined reference point, variations in the position of the celestial body within the captured frame can indicate a positional deviation.

In another embodiment, detecting the positional deviation may involve sensor-based monitoring. Gyroscopic sensors, accelerometers, or magnetometers integrated into the PTZ camera can detect changes in angular orientation, tilt, or position due to environmental factors such as strong winds, vibrations, or pole misalignment. For example, if a gyroscopic sensor detects a tilt shift of a few degrees, the system triggers a recalibration event. This embodiment is particularly useful for identifying deviations caused by physical disturbances like hurricanes, heavy rainfall, or external impacts.

Additionally, in some embodiments, the PTZ camera may analyze metadata from its GPS module to determine any deviation in its geographical position. For example, if the camera is mounted on a movable pole or platform that has shifted slightly, the GPS data will indicate a difference in location coordinates, prompting the system to initiate further verification of the deviation.

At step S706, once a deviation is detected, the PTZ camera uses its pan-tilt-zoom (PTZ) controls to capture a reference image of the predefined reference point. In some embodiments, the system may adjust the PTZ parameters dynamically to recenter the predefined celestial reference point within the camera's frame. The adjustment involves fine-tuning the pan (horizontal rotation), tilt (vertical angle), and zoom levels based on calculated positional offsets. For example, if the Sun is selected as the reference point, the camera aligns its lens such that the center of the Sun coincides with the center of the frame in the captured reference image.

In another embodiment, multiple snapshots of the reference point may be captured at incremental PTZ positions to improve accuracy. For instance, the system may capture a series of images with slight changes in tilt and pan angles and analyze the images to determine the position of the celestial body with high precision. Image processing algorithms such as center-of-mass calculation or blob detection can be employed to identify the exact coordinates of the celestial body within the frame.

In certain embodiments, the system may employ additional environmental verification techniques to ensure the reference point is valid. For instance, if the weather causes partial obstruction of the celestial body (e.g., cloud cover), the camera may rely on historical positional data or predict the approximate position of the celestial body based on its expected azimuth and elevation values at the given time and location.

Thus, step S704 ensures accurate detection of positional deviation through image comparison, sensor-based detection, or GPS monitoring, while step S706 captures a precise reference image of the predefined celestial reference point using dynamic adjustment of the PTZ controls. This two-step process allows the system to identify and address alignment deviations effectively, ensuring consistent POV tracking of the PTZ camera.

The method further comprises calculating a home preset for the PTZ (pan-tilt-zoom) camera based on the captured reference image and the predefined reference point. The home preset is used to establish the desired initial orientation of the camera in relation to the predefined reference point, ensuring that the camera returns to a consistent viewpoint. In certain embodiments, this calculation process involves determining the alignment and positioning of the camera with respect to the celestial body or other relevant objects in the environment. The home preset can be recalibrated periodically to adjust for any misalignments or environmental factors. The recalibration of the camera's orientation occurs by adjusting the pan-tilt-zoom controls at steps S708 and S710, where the pan, tilt, and zoom controls are dynamically adjusted to realign the camera according to the newly calculated home preset.

In some embodiments, calculating the home preset further comprises accounting for seasonal variations in the position of the predefined reference point. For example, seasonal changes may cause slight shifts in the position of celestial bodies due to the Earth's orbit or atmospheric effects. By incorporating this seasonal positional data, the camera's orientation is adjusted to maintain consistent alignment with the reference point throughout the year. This adjustment helps improve the accuracy and stability of the camera's point-of-view (POV), regardless of changing environmental factors.

In other embodiments, calculating the home preset further involves determining the optimal orientation of the PTZ camera when the celestial body is partially obscured by environmental factors, such as clouds, atmospheric distortion, or obstructions. In such cases, the method utilizes pre-existing astronomical data, which includes historical data on the celestial body's location and trajectory, and previously captured reference images to estimate the position of the celestial body. These previously captured reference images can provide a record of the celestial body's apparent position during clear conditions, allowing for an interpolation of its position when partially obscured. This method ensures that even when full visibility of the celestial body is not available, the camera can still adjust its orientation based on reliable data, maintaining alignment with the reference point as closely as possible.

In certain embodiments, the system may leverage real-time updates from astronomical databases or APIs to adjust the camera's positioning dynamically. These updates, combined with historical data, allow for a robust and adaptive recalibration of the camera's orientation, ensuring accuracy even when environmental conditions fluctuate.

In some embodiments, accounting for the seasonal position variations comprises determining a position of the predefined reference point at a specified time of day, considering the tilt in an axis of earth, and adjusting a position of the PTZ camera to a designed geographic latitude.

In some embodiments, recalibrating the orientation of the PTZ camera involves an initial step of measuring the camera's current orientation using integrated gyroscopic sensors. These sensors are typically embedded within the camera system and are responsible for detecting rotational movements across multiple axes, such as pan (horizontal rotation), tilt (vertical rotation), and zoom (field of view adjustments). The gyroscopic sensors provide real-time feedback on the camera's position, helping to accurately track any deviations from the intended orientation.

Once the current orientation is measured, the method proceeds by determining the necessary adjustment parameters needed to restore the camera to its predefined home preset. These adjustment parameters are calculated based on the difference between the current orientation (as provided by the gyroscopic sensors) and the desired home preset, which is previously established either through celestial navigation techniques or predefined settings. The parameters include, but are not limited to, pan, tilt, and zoom adjustments. For instance, if the camera is slightly misaligned, the adjustment parameters could involve fine-tuning the pan angle by a few degrees or tilting the camera by a specific angle to realign the camera's viewpoint with the reference point.

In some embodiments, the adjustment parameters are dynamically recalculated based on continuous sensor readings, allowing the camera to make real-time corrections as environmental factors or movements cause the camera to drift from its optimal position. These recalibration processes can be executed autonomously by the camera system, which continuously monitors and updates its orientation in response to sensor data, ensuring that the camera's point-of-view remains aligned with the reference point or celestial object.

Additionally, in some configurations, the adjustment parameters may include corrective actions based on external inputs, such as a detected obstruction or changes in the camera's field of view due to dynamic environmental conditions like wind or vibration. In these cases, the system may utilize a combination of sensor data (from gyroscopes, accelerometers, and other motion sensors) and real-time image processing (from the camera feed) to fine-tune the camera's orientation. This further enhances the accuracy and stability of the system, ensuring that the camera consistently maintains its alignment with the predefined reference point under varying conditions.

Moreover, in advanced embodiments, the recalibration process may also include predictive algorithms that consider the camera's historical performance and environmental patterns, allowing the system to anticipate necessary adjustments before deviations occur, further improving the efficiency of the recalibration process.

In some embodiments, the method further comprises configuring the PTZ camera with a preset sequence of one or more celestial bodies to track during different times of the day. This sequence is predetermined based on the expected visibility and location of various celestial bodies—such as the Sun, Moon, stars, or planets—at specific times, depending on the geographic location of the camera. The preset sequence is designed to optimize the camera's tracking capabilities by aligning it with celestial objects that are most prominent or relevant for tracking purposes at different times throughout the day or night. For instance, during the daytime, the camera may primarily track the Sun, while at night, it might switch to tracking other celestial bodies such as stars or planets.

The preset sequence may be stored in the camera's internal system or in a connected external system, such as a cloud-based server or local database, which can provide real-time updates and adjustments based on celestial movement predictions. This sequence can be established through a combination of astronomical calculations and historical data about the camera's location, as well as the desired tracking objectives (e.g., celestial navigation, time-lapse photography, or surveillance).

Furthermore, in some embodiments, the PTZ camera is configured to automatically switch between the one or more celestial bodies based on availability and visibility conditions. For example, if a celestial body becomes obstructed by clouds, atmospheric disturbances, or other environmental factors, the camera will seamlessly transition to tracking a different celestial body that is visible at that time. The camera can determine visibility conditions through a combination of real-time weather data, image processing, and sensor inputs, such as light levels or sky conditions. If the primary celestial body is obscured, the camera could switch to tracking the Moon if it is visible or to a different star or planetary body, depending on the time of day and its current position in the sky.

This automatic switching capability can be enhanced through algorithms that predict celestial visibility based on factors such as time of day, weather patterns, and geographic location. For instance, the system might use weather forecasting data to anticipate cloud cover or atmospheric conditions and adjust its tracking strategy accordingly. In this way, the camera ensures continuous tracking of relevant celestial bodies, without requiring manual intervention, and can adapt in real-time to changes in environmental conditions.

In some advanced embodiments, the PTZ camera may be integrated with an intelligent tracking system that uses a combination of GPS data, weather data, and astronomical databases to automatically adjust the tracking sequence and optimize the camera's orientation. This system could be capable of dynamically switching between multiple celestial bodies based on their visibility and relevance, ensuring that the camera always tracks the most appropriate object. For example, in a surveillance or scientific research context, this dynamic switching ensures that the camera continues to capture relevant celestial events, regardless of shifting conditions.

In some embodiments, the method is implemented as a software module embedded within the firmware of the PTZ camera, or as part of a video management system (VMS) that controls the PTZ camera. When implemented in the firmware of the PTZ camera, the software module operates directly within the camera's internal processing system, allowing for real-time control and adjustment of the camera's functions, including orientation, tracking of celestial bodies, and automatic recalibration. The firmware-based implementation ensures that the method can operate autonomously and with minimal reliance on external systems, making it suitable for use in remote or standalone camera setups.

The firmware can be customized to include algorithms for calculating home presets, calibrating the orientation based on gyroscopic data, switching between celestial bodies, and adjusting the PTZ controls accordingly. This embedded software allows the PTZ camera to process data from its onboard sensors (e.g., gyroscopes, accelerometers, light sensors) and integrate it with celestial navigation data, enabling real-time tracking adjustments without needing continuous input from external sources. Additionally, the firmware can be updated periodically to incorporate new algorithms, optimize performance, or respond to changes in environmental factors.

In alternative embodiments, the method may be implemented as a software module within a Video Management System (VMS), which is typically used for managing and controlling multiple cameras within a networked surveillance or monitoring system. A VMS is a more comprehensive system that not only controls camera orientation but also provides additional features such as video recording, event detection, and user interface management. When the software module is integrated into the VMS, the VMS serves as the central control hub for coordinating the tracking and calibration operations of the PTZ camera.

The VMS-based implementation provides the advantage of centralized management, enabling the PTZ camera's tracking settings and recalibration to be monitored, adjusted, and synchronized with other cameras in a larger system. For example, in a network of cameras tracking various celestial bodies across different geographical locations, the VMS can oversee the entire process, ensuring that all cameras are aligned and operating according to the preset tracking sequences and visibility conditions. The VMS can also include a user-friendly interface for configuring celestial body sequences, adjusting camera settings, and viewing live or recorded footage, allowing operators to monitor the system remotely and make adjustment if necessary.

In some advanced embodiments, the VMS might use cloud-based services or machine learning algorithms to predict the best celestial bodies for tracking based on location, time of day, weather conditions, and camera capabilities. The VMS could then automatically send updated configuration settings to the PTZ cameras, allowing them to adjust their tracking parameters without operator intervention.

The software module, whether implemented in the camera firmware or within the VMS, is designed for seamless integration into the existing camera architecture and provides flexibility in how the tracking and calibration tasks are managed. This allows for the use of the method in a variety of applications, from standalone camera systems to large-scale, distributed camera networks.

In some embodiments, the method further comprises continuously monitoring and recalibrating the PTZ camera to ensure consistent point-of-view (POV) alignment over time. This ongoing monitoring process involves the continuous assessment of the camera's orientation and alignment with the predefined reference point or celestial object. The camera's position is regularly evaluated using various onboard sensors, including gyroscopic sensors, accelerometers, and image-based tracking systems, which provide real-time feedback on the camera's current orientation. These sensors allow the system to detect even slight shifts in the camera's alignment, which could occur due to external environmental factors such as wind, temperature fluctuations, mechanical wear, or other disturbances.

The method includes dynamic recalibration routines that adjust the camera's pan, tilt, and zoom controls to correct any deviations from the desired POV. Recalibration may be triggered automatically whenever misalignment is detected, ensuring that the camera consistently remains pointed at the correct reference point or celestial object, regardless of any environmental influences. For example, if the camera experiences a drift due to vibrations or a minor mechanical issue, the system will automatically adjust the pan and tilt angles to realign the camera's viewpoint without manual intervention.

In some embodiments, the system can perform recalibration at regular intervals, such as every few minutes or hours, depending on the application's sensitivity requirements. For critical applications, such as astronomical observations, surveillance, or geospatial monitoring, recalibration may be performed more frequently to ensure precise alignment at all times. The frequency and method of recalibration can be customized based on the specific needs of the use case, such as balancing between performance and resource consumption.

Furthermore, the continuous monitoring and recalibration process can incorporate predictive algorithms that anticipate changes in the camera's orientation based on historical data and environmental conditions. For instance, if the system detects that certain factor, like seasonal shifts or expected weather patterns, may affect the camera's alignment, it can preemptively adjust its recalibration schedule or parameters. This predictive approach helps maintain optimal alignment, even before any noticeable drift occurs.

In some advanced embodiments, the PTZ camera system can be integrated with external monitoring devices, such as weather stations, which provide real-time environmental data (e.g., wind speed, temperature changes, atmospheric pressure). By factoring this data into the recalibration process, the system can more accurately compensate for external forces that may affect the camera's orientation. Additionally, the system can be linked to a centralized management system or video management platform (VMS), which can oversee and control the recalibration process across multiple cameras, ensuring that all devices in a distributed network maintain proper alignment in unison.

Moreover, in certain configurations, the camera could be equipped with machine learning capabilities that allow it to learn from past recalibration events, optimizing the process over time. By analyzing trends in misalignments and recalibration adjustments, the camera could fine-tune its monitoring thresholds and recalibration parameters, increasing efficiency and minimizing unnecessary adjustments.

Figure 8:
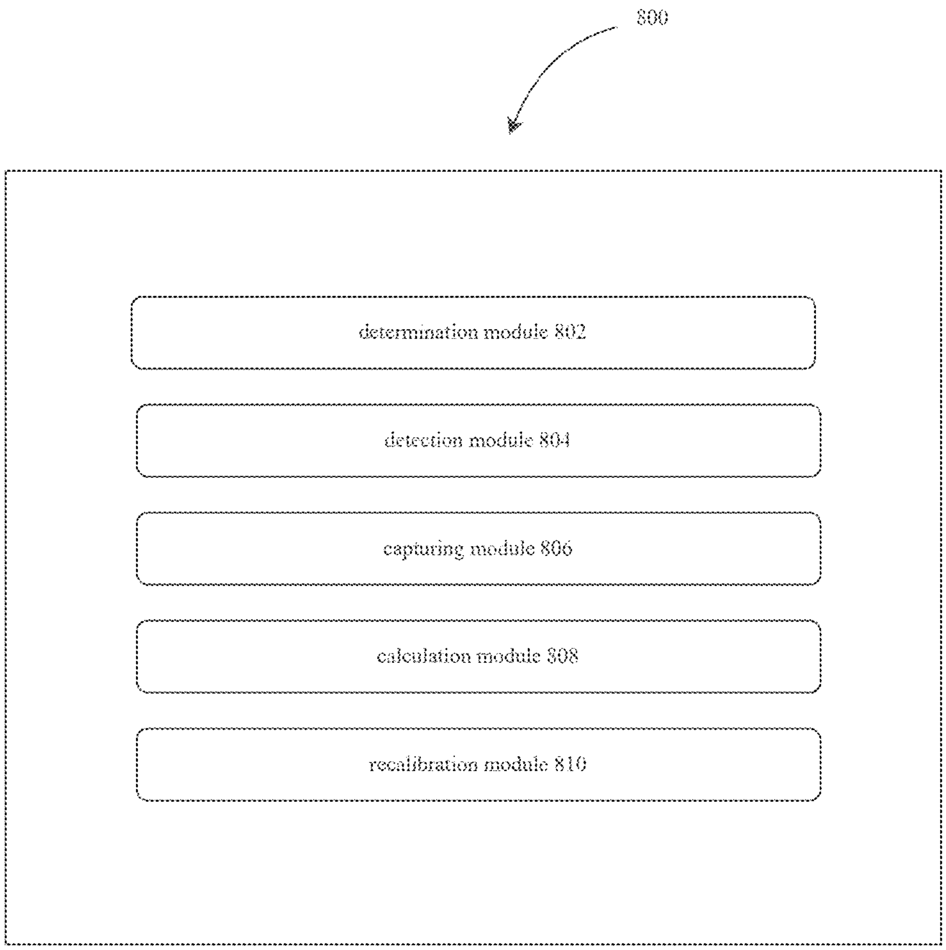
FIG. 8 illustrates a system for maintaining alignment of a point-of-view (POV) in a pan-tilt-zoom (PTZ) camera according to an embodiment of this disclosure.

FIG. 8 illustrates a system for maintaining the alignment of a point-of-view (POV) in a pan-tilt-zoom (PTZ) camera according to an embodiment of the disclosure. The system comprises several key modules: a determination module 802, a detection module 804, a capturing module 806, a calculation module 808, and a recalibration module 810. Each module performs a specific function to ensure the camera remains properly aligned with its predefined reference point, thereby maintaining an accurate and stable POV The determination module 802 is configured to determine the initial orientation of the PTZ camera. The determination process involves obtaining position information of the PTZ camera, such as its geographical coordinates (latitude, longitude, and altitude), time synchronization data, and information of at least one predefined reference point. The reference point could be a celestial body (e.g., Sun, Moon, stars) or a terrestrial feature used for alignment purposes. The time synchronization information ensures that the camera's movements and data collection are precisely coordinated with the current time, facilitating accurate tracking and alignment with the reference point.

Once the initial orientation is established, the detection module 804 is responsible for monitoring and detecting any positional deviation of the PTZ camera from its determined initial orientation. This module continuously evaluates the camera's real-time position by comparing its current orientation with the intended orientation. If a deviation is detected, it triggers the next steps to restore alignment.

Upon detection of a positional deviation, the capturing module 806 activates the camera's pan-tilt-zoom controls to capture a reference image of the predefined reference point. The reference image serves as a visual record that the system uses to assess the camera's current alignment. This image is essential for calculating adjustments needed to realign the camera.

The calculation module 808 processes the captured reference image and compares it with the predefined reference point. Based on this comparison, the module calculates a home preset for the PTZ camera. This home preset represents the optimal orientation that the camera should adopt to restore proper alignment with the reference point. In some embodiments, the calculation module 808 is further configured to account for seasonal position variations of the predefined reference point. For example, the position of celestial bodies such as the Sun or stars can shift throughout the year due to the Earth's orbit, requiring adjustments in the camera's orientation.

Once the home preset is calculated, the recalibration module 810 is responsible for adjusting the camera's orientation by recalibrating its pan-tilt-zoom controls. The recalibration process ensures that the camera is realigned to the calculated home preset, thus restoring accurate tracking of the reference point, and ensuring a consistent POV.

In some embodiments, the calculation module 808 is further configured to account for seasonal position variations of the predefined reference point. This means the module uses astronomical data to adjust for the shifting positions of celestial bodies throughout the year. For example, the Sun's position in the sky changes with the seasons, so the camera's tracking system adjusts the home preset to account for these variations, ensuring the camera remains accurately aligned even as the celestial body's position changes.

In some embodiments, the calculation module 808 is further configured to determine the position of the predefined reference point at a specified time of day, taking into consideration the tilt in the axis of Earth (i.e., axial tilt). This adjustment process is crucial for accurate tracking of celestial bodies, as the axial tilt affects the apparent path of the Sun, Moon, and stars across the sky. The calculation module 808 can also adjust the position of the PTZ camera based on the desired geographic latitude of the camera. For example, at different latitudes, the camera may need to track celestial bodies at different angles, so the system recalculates and modifies the camera's orientation to match the specific geographic location.

In some embodiments, the determination module 802 that is configured to determine the initial orientation of the PTZ camera is further configured to: receive the position information including geographical location coordinates of the PTZ camera, synchronize the PTZ camera with a real-time clock, and configure the camera to track the predefined reference point. The synchronization with a real-time clock ensures that the camera's movements are precisely aligned with time-based celestial events (e.g., the Sun's position at noon or the Moon's position at specific phases). This synchronization is essential for maintaining accurate tracking of the reference point over time, particularly for applications that require high precision, such as astronomical observations or surveillance systems that track the movement of celestial bodies.

In some embodiments, the detection module 804 that is configured to detect positional deviation is further configured to compare real-time images captured by the PTZ camera with reference images associated with the home preset. By comparing the real-time images with stored reference images, the detection module 804 identifies any positional shifts based on variations in the alignment of the images. These variations may include changes in the relative position of the predefined reference point, such as the Sun or a star, within the field of view of the camera. If a deviation is detected, the system triggers the recalibration process to restore alignment.

In some embodiments, the recalibration module 810 is configured to recalibrate the orientation of the PTZ camera and is further configured to: measure the PTZ camera's current orientation using integrated gyroscopic sensors and determine adjustment parameters for restoring the home preset. The gyroscopic sensors provide real-time data on the camera's pan, tilt, and zoom angles, allowing the recalibration module 810 to determine how far the camera has deviated from the preset position. Based on this data, this module 810 computes the necessary adjustments and commands the pan-tilt-zoom controls to reposition the camera to its optimal orientation.

In some embodiments, the predefined reference point is a celestial body selected from a group consisting of the Sun, Moon, and stars. These celestial bodies are ideal reference points for maintaining alignment, as their positions can be predicted and tracked using astronomical data, ensuring precise and consistent camera orientation over long periods. By using celestial bodies, the system can align the camera with stable and predictable points in the sky, which are particularly useful in outdoor applications where terrestrial features may not be as reliable.

In some embodiments, the system further comprises a configuration module (not shown) that is configured to configure the PTZ camera with a preset sequence of one or more celestial bodies to track during different times of the day. The configuration module allows the system to define which celestial bodies the camera will track at various times, optimizing the camera's tracking capability based on visibility conditions and the time of day. The system can then automatically switch between the one or more celestial bodies based on their availability and visibility conditions. For example, during the daytime, the camera may track the Sun, and at night, it may switch to tracking stars or the Moon, depending on which celestial body is most prominent and visible in the sky. This automatic switching feature ensures continuous and accurate tracking without requiring manual intervention.

Figure 9:
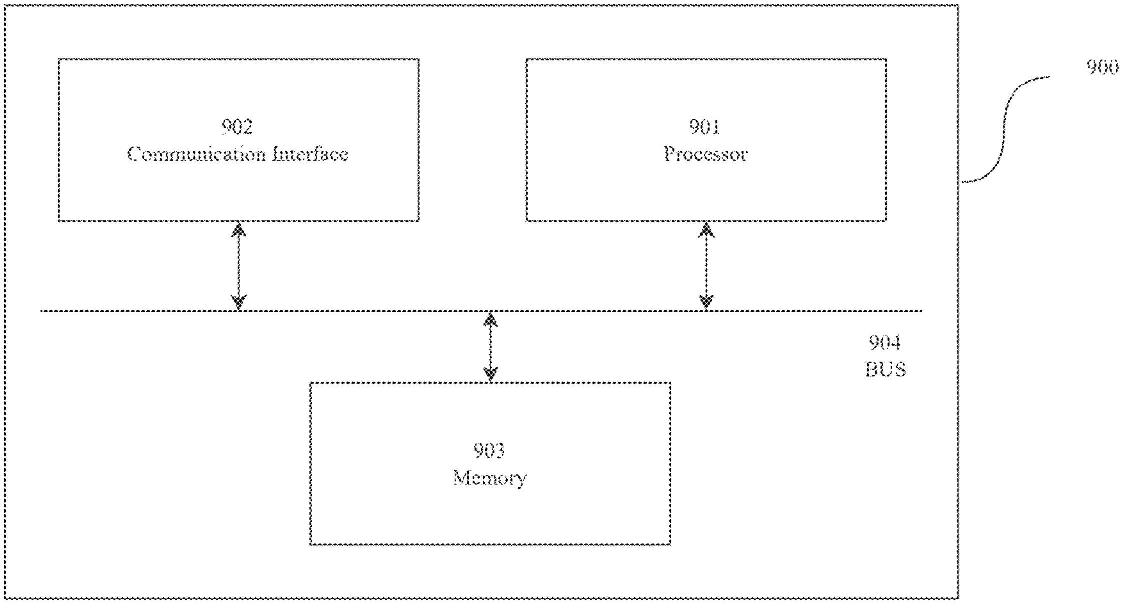
FIG. 9 illustrates another system for maintaining alignment of a point-of-view (POV) in a pan-tilt-zoom (PTZ) camera according to an embodiment of this disclosure.

FIG. 9 illustrates a schematic diagram of another communication apparatus 900 according to an embodiment of the disclosure. The communication apparatus 900 includes a processor 901, a communication interface 902, and a memory 903. The processor 901, the communication interface 902, and the memory 903 may be connected to each other via a bus 904. The bus 904 may be a peripheral component interconnect (peripheral component interconnect, PCI) bus, an extended industry standard architecture (extended industry standard architecture, EISA) bus, or the like. The bus 904 may be classified into an address bus, a data bus, a control bus, and the like. For ease of representation, the bus is represented by using only one line in FIG. 4, but it does not indicate that there is only one bus or one type of bus. The processor 901 may be a central processing unit (central processing unit, CPU), a network processor (network processor, NP), or a combination of a CPU and an NP. The processor 901 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (Generic Array Logic, GAL), or any combination thereof. The memory 903 may be a volatile memory or a non-volatile memory or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random-access memory (random access memory, RAM), and is used as an external cache.

The connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or products. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may conduct a variety of functions under the control of one or more microprocessors or other control products. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, products, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method for maintaining alignment of a point-of-view (POV) in a pan-tilt-zoom (PTZ) camera, the method comprising:

determining an initial orientation of the PTZ camera, wherein the determination comprises obtaining data comprising position information of the PTZ camera, time synchronization information, and information of at least one predefined reference point;

detecting a positional deviation of the PTZ camera from the initial orientation;

capturing a reference image of the predefined reference point using pan-tilt-zoom controls of the PTZ camera when the positional deviation is detected;

calculating a home preset for the PTZ camera based on the captured reference image and the predefined reference point; and recalibrating orientation of the PTZ camera based on the calculated home preset by adjusting the pan-tilt-zoom controls.

2. The method of claim 1, wherein calculating the home preset comprises accounting for seasonal position variations of the predefined reference point.

3. The method of claim 1, wherein determining the initial orientation of the PTZ camera comprises:

receiving the position information including geographical location coordinates of the PTZ camera;

synchronizing the PTZ camera with a real-time clock; and configuring the PTZ camera to track the predefined reference point.

4. The method of claim 1, wherein detecting the positional deviation comprises:

comparing real-time images captured by the PTZ camera with reference images associated with the home preset; and identifying a positional shift based on variations in an alignment of the images.

5. The method of claim 1, wherein recalibrating the orientation of the PTZ camera comprises:

measuring the PTZ camera's current orientation using integrated gyroscopic sensors; and determining adjustment parameters for restoring the home preset.

6. The method of claim 1, wherein the predefined reference point is a celestial body selected from a group consisting of Sun, Moon, and stars.

7. The method of claim 1, wherein the method is implemented as a software module in one or more of:

a firmware of the PTZ camera; or a video management system (VMS) that controls the PTZ camera.

8. The method of claim 1, further comprises continuously monitoring and recalibrating the PTZ camera to ensure consistent POV alignment over time.

9. The method of claim 2, wherein accounting for the seasonal position variations comprises:

determining a position of the predefined reference point at a specified time of day;

considering the tilt in an axis of earth; and adjusting a position of the PTZ camera to a designed geographic latitude.

10. The method of claim 6, further comprising:

configuring the PTZ camera with a preset sequence of one or more celestial bodies to track during different times of the day; and automatically switching between the one or more celestial bodies based on availability and visibility conditions.

11. The method of claim 6, wherein calculating the home preset further comprises determining the home preset when the celestial body is partially obscured by utilizing pre-existing astronomical data and previously captured reference images.

12. A non-transitory computer-readable medium having stored thereon computer-executable instructions that, when executed by a processor, cause the processor to execute a method for maintaining alignment of a point-of-view (POV) in a pan-tilt-zoom (PTZ) camera, comprising:

determining an initial orientation of the PTZ camera, wherein the determination comprises obtaining data comprising position information of the PTZ camera, time synchronization information, and information of at least one predefined reference point;

detecting a positional deviation of the PTZ camera from the initial orientation;

capturing a reference image of the predefined reference point using pan-tilt-zoom controls of the PTZ camera when the positional deviation is detected; calculating a home preset for the PTZ camera based on the captured reference image and the predefined reference point; and recalibrating orientation of the PTZ camera based on the calculated home preset by adjusting the pan-tilt-zoom controls.

* * * * *